(No Model.)
R. EICKEMEYER, Dec'd.
R. EICKEMEYER, Jr., Executor.
SPEED REGULATOR FOR ELECTRIC MOTORS.
No. 564,558. Patented July 21, 1896.
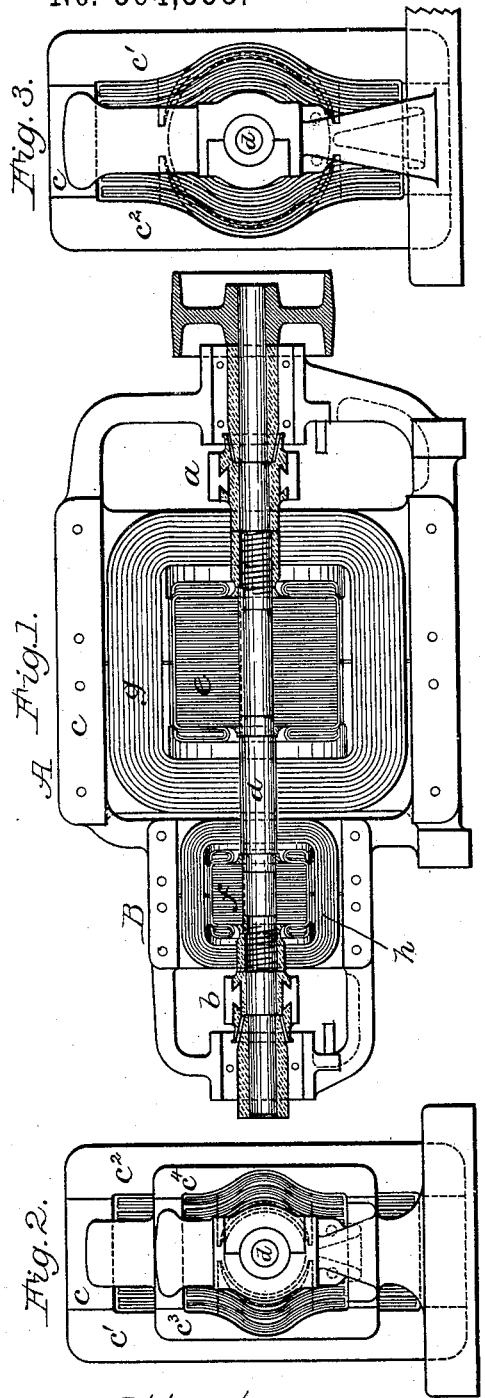
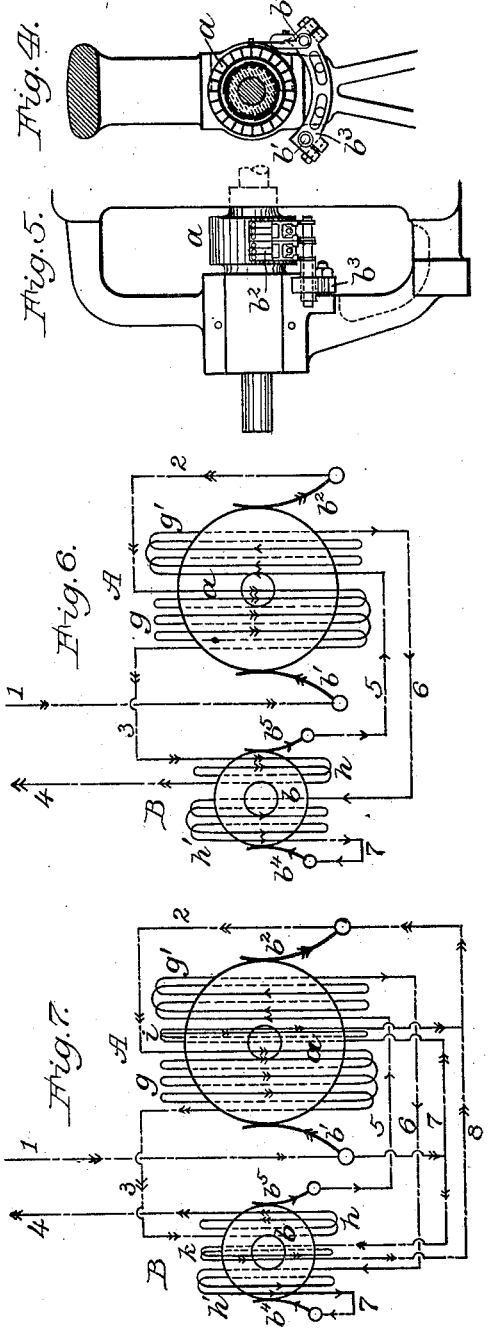
Attest:
Philip F. Larner
Howell Barter
Inventor:
Rudolf Eickemeyer
By Wm C. Nead
Attorney.

UNITED STATES PATENT OFFICE.

RUDOLF EICKEMEYER, OF YONKERS, NEW YORK; RUDOLF EICKEMEYER, JR., EXECUTOR OF SAID RUDOLF EICKEMEYER, DECEASED.

SPEED-REGULATOR FOR ELECTRIC MOTORS.

SPECIFICATION forming part of Letters Patent No. 564,558, dated July 21, 1896.

Application filed October 6, 1891. Serial No. 407,830. (No model.)

*To all whom it may concern:*

Be it known that I, RUDOLF EICKEMEYER, of Yonkers, in the county of Westchester and State of New York, have invented a certain new and useful Method of and Means for Operating and Regulating the Speed of Electric Motors; and I do hereby declare that the following specification, taken in connection with the drawings furnished and forming a part of the same, is a clear, true, and complete description of the several features of my invention.

With an ordinary electric motor supplied with a current of constant strength, as, for instance, from a commercial constant-current arc-light circuit, the "pull" of the motor is practically constant so long as the supplied current remains the same, and, therefore, if load is thrown upon the motor it will either be unable to start when the load exceeds the pull of the motor, or, if it starts, it will begin to race, and it is absolutely unable to run with uniform speed under varying loads. Motors thus supplied with electricity need, therefore, some system of control by which the speed of the motor will be regulated, according to the varied load under which it may be operated from time to time, and this regulating has been heretofore automatically accomplished by means of various forms of centrifugal governors, which appropriately connect or cut out more or less of the motor field-coils with or from the commercial circuit, and thereby strengthen or weaken the magnetic field of the motor, or, in other words, vary the pull of the motor according to varying loads.

High-speed centrifugal governors involve certain well-known mechanical defects and uncertainties in their operation, inasmuch as they do not and cannot begin to act until after the speed of the motor has considerably exceeded the normal or desired degree, because in part of the friction in the governing mechanism which must first be overcome before it can act, thus involving a liability of causing the speed of the motor to objectionably fluctuate more or less within certain limits, respectively, below and above the speed actually required or desired.

My novel method of operating and self-regulating electric motors consists in supplying the field-coils of a motor with an electric current sufficient to drive the motor at a required speed under its maximum load and in neutralizing the magnetization induced by said field-coils by an independent electric current generated by power afforded by the motor, and in proportions exactly corresponding with such decrease in the load as would otherwise cause the motor to increase its speed. In other words, I have, as I believe, for the first time organized with an electric motor means for generating a governing electric current, which, being independent of the main or supply circuit, and variably generated by power afforded by the motor, is so employed in the magnetic field of the motor as to variably neutralize the magnetization afforded by the constant-supply circuit to a degree corresponding with the strength required in the magnetic field, from time to time, for operating the motor under all possible variations in load.

The means for generating this independent governing electric current may be widely varied without departure from my invention, if said means be capable of mechanical operation, and the generator can be, and is, driven by the motor, and consequently driven at a speed which will appropriately conform with that of the motor, whether at a higher speed than the motor-armature or at a lower speed; but I prefer to drive the two at the same speed, and to have the armature of the generator carried by the armature-shaft of the motor.

The neutralizing current is supplied to suitable governing-coils, so located with relation to the field-coils as to enable the governing-coils to promptly weaken the magnetic field of the motor whenever its speed requires to be checked, and the governing-coils as promptly resume their normal or non-controlling condition upon the resumption of normal speed by the motor. I have successfully employed the main features of my present improvements in electric elevators, and a disclosure thereof was made in my application for Letters Patent, filed January 5, 1891, Serial No. 376,740. The use of an independent electric generator, operated by and at a speed varying with the varied speed of a motor, in accordance with the main feature of my invention, does not necessarily involve such an operation of the governor-dynamo as will cause it to initially operate in lessening the power of the magnetic field of the motor.

In accordance with another portion of my invention the governor-dynamo is caused to initially operate in augmenting the magnetic field of the motor, thus increasing the pull and enabling the latter to start promptly, and when it approaches its normal speed the magnetic field of the governor-dynamo is neutralized, thus rendering it inactive; but as soon as the speed of the motor exceeds the normal rate the governor-dynamo, without having its rotation reversed, is enabled to generate and supply a neutralizing current in the motor-field, in exact proportion to all requirements incident to any undue speed of the motor or variations in load thereon.

My system of regulation is applicable to various forms of electric motors, but for purposes of illustration I have selected a motor and a generator of the type devised by me, and disclosed in my Letters Patent No. 358,340, and after describing the illustrated organizations in detail, the several features of my invention will be duly specified in appropriate clauses of claim hereunto annexed.

Referring to the drawings, Figure 1 illustrates in longitudinal central section a motor with its electric governor combined therewith in accordance with my invention and in what I deem its best form. Figs. 2 and 3 illustrate the same in end views, but with the brushes detached. Figs. 4 and 5 in two views illustrate the commutator and its brushes, only one of the latter being shown in Fig. 4. Fig. 6 illustrates diagrammatically the electric organization. Fig. 7 in like manner illustrates the same electric organization with additional sets of coils in both the motor and governor for securing prompt action by the motor in starting.

Referring to Figs. 1, 2, and 3, the motor A and regulator or governor B are here shown to be organized within one frame, the motor-commutator being at $a$ and the governor-commutator at $b$.

The frame of the machine affords metal for the magnetic system of both the motor and the governor, and it consists of a central frame $c$, which longitudinally surrounds the armatures of the motor and governor, and at its two ends affords bearing-seats for the shaft $d$, which carries the motor-armature $e$, and also the governor-armature $f$. The frame $c$ has bolted thereto cheek-pieces $c'$ and $c^2$ for the motor, and at $c^3 c^4$ there are smaller cheek-pieces for the governor, the interior spaces, respectively afforded, accommodating the two armatures. Within this magnetic metal, and longitudinally surrounding the motor-armature $e$, there are coils at $g$, a portion of which is a true field-coil connected with the supply-circuit, and another portion is a governing-coil in an independent circuit, supplied by the governor, dynamo. Similar main coils at $h$ surround the armature $f$ of the governor, and are also within the magnetic metal.

The commutators $a$ and $b$ are substantially alike, both having brushes mounted, as at $b' b^2$, on an adjustable curved base $b^3$, as illustrated in Figs. 4 and 5.

Referring now to Fig. 6, the motor is diagrammatically illustrated at A, with its commutator-brushes $b' b^2$, and the dynamo-governor at B with its brushes $b^4 b^5$. The true field-coil of the motor is shown at $g$, and the governing-coil at $g'$. The governor-dynamo has a field-coil $h$ and an auxiliary coil $h'$. The electric supply-current, entering the system by way of conductor 1, passes to brush $b'$, thence through the motor-armature to brush $b^2$, thence by conductor 2 to main motor field-coil $g$, thence in series by conductor 3 to the field-coil $h$, of the governor, and thence out to line-conductor 4, this circuit remaining unchanged during the operation of the motor. The governing-circuit, commencing at the brush $b^5$, delivers its current at the motor by way of conductor 5, traverses the governor-coil $g'$ in the motor in a direction opposite to the current in the field-coil $g$, thence by conductor 6 to an auxiliary coil $h'$ in the governor-dynamo, which it traverses in a direction corresponding with that of the main current in the field-coil $h$, and passes thence by conductor 7 to brush $b^4$, and thence through the armature to brush $b^5$.

The operation of this organization is as follows: The motor, on receiving an appropriate field-exciting current, will be driven to the maximum desired speed with its maximum load. So long as the motor so operates, the governor-dynamo, being initially excited to a small extent by the coil $h$, generates but little current for the governing-coil $g'$ of the motor, but should a portion of the load be thrown from the motor, and its speed commence to increase above the normal, the governor-dynamo with its increased speed correspondingly increases its generating capacity, and so further supplies the motor-governing coil $g'$ that it neutralizes a sufficient portion of the magnetization induced by the motor field-coil $g$, thus promptly checking the speed of the motor. By the time the speed is again normal the generating capacity of the governor will have been lessened in exact proportion to the speed of the motor, regardless of the extent to which the load on the motor may have been removed.

Should the motor reach greatly undue speed, the exciting capacity of the governing-coil $g'$ of the motor would become greater than the capacity of the field-coil $g$, and then the motor-field would be reversed, and if the motor continued to run at such speed it would commence to operate as a generating-dynamo, sending current to line with all the braking effect incident to such an expenditure of rotative energy.

With the coils $h$ and $h'$ of the governor-dynamo properly proportioned to the governing service desired, the governor will exercise little or no neutralizing effect on the motor while the latter is running with its full load and at normal speed, it being intended that the governor-dynamo should not begin to generate its independent current until just before the motor reaches its proper speed.

Should the electric supply at any time fall a little short of requirements for enabling the motor to be operated at full speed with its full load, some of the latter may be thrown off for a while to permit the motor speed to increase, and then the independent current passing from the governor to the motor-coil $g'$ may be reversed in direction, (as by a reversing-switch,) thus causing the coil $g'$ to coöperate with the coil $g$ in affording a stronger magnetic field, and so enable the motor to carry its full load, but in such case the generating-dynamo would of course cease to act fully as a governor, although the motor under such circumstances would be but little liable to race.

As hereinbefore indicated, one feature of my invention provides for enabling the governor-dynamo to initially operate in augmenting the magnetic field of the motor for enabling it to start promptly, and thereafter the governor will remain inactive as an electric generator so long as the speed of the motor is at its normal rate, but when the speed commences to exceed said rate, the governor-dynamo has its field reversed, and then it operates in so far weakening the field of the motor as to cause the latter to reduce its speed to the normal rate.

A motor with its governing-dynamo organized for operating as auxiliary to the motor is illustrated in Fig. 7, wherein the motor A and governor B are provided, respectively, with coils $g\ g'$ and $h\ h'$, as before described, but the motor is provided with an additional or auxiliary coil $i$ and the governor-dynamo with another coil $k$, both of fine wire. These two coils are in a shunt-circuit connected with the motor-brushes $b'\ b^2$, as shown by way of conductors 7 and 8.

The shunt-wound coil $i$, in a prompt-starting motor, is excited in the same direction as the main motor-coil $g$, and hence it operates as an auxiliary field-coil; but the coil $k$ in the governor-dynamo operates as a governing-coil, and is excited in a direction opposite to that in its main circuit-coil $h$. In operating this organization the starting of the motor will cause the governor-dynamo to supply whatever current it may generate from the excitation of its main circuit-coil $h$ to the motor-coil $g'$, and in the same direction as the supply-current in the main motor-coil $g$, thus increasing the pull of the motor and augmenting its starting capacity. When the speed of the motor is increased, its electromotive force sends a current through the shunt-coil $k$, which so far neutralizes the magnetism in the governor-dynamo that the latter during subnormal speed is rendered wholly inactive; but when the speed of the motor increases and reaches the normal rate the exciting power of the shunt-coil $k$ in the governor-dynamo exceeds that of the supply-current coil $h$, and thereby reverses the field of the dynamo, so that the latter will then supply a current in an opposite direction from that which it generated at low speed, and this neutralizing-current, supplied to the motor governing-coil $g'$, will so far weaken the motor-field as to prevent the motor from racing. Inasmuch as the governor-dynamo, when thus organized, is practically inactive as a retarding medium when the motor is running at any subnormal speed, and is prompt and powerful in its control over the motor as soon as its speed exceeds the normal rate, it is obvious that the governor will afford an exceedingly sensitive regulation.

Although under varying conditions some of the several coils in the motor and the generator or governor-dynamo may be and are variably excited, it will be obvious that the coil $g$ of the motor and coil $h$ of the generator will always operate as true field-coils, and that they will always be supplied from outside sources with appropriate electric currents; also that the coil $g'$ of the motor will always operate as a governing field-coil, and also that the coil $h'$ of the generator will serve therein as a governing field-coil, and also that the coil $i$ in the motor of Fig. 7 will operate as an auxiliary field-coil, coöperating with the main field-coil $g$ in the motor, while the coil $k$ in the generator will coöperate with the motor governing field-coil $h'$, either for lessening the capacity of the generator to supply a current in one direction or for enabling the generator, without reversal in rotation, to supply a current in an opposite direction, and to thereby cause the governing-dynamo to at times strengthen the magnetic field of the motor and at other times weaken it.

Having thus described my invention, I claim as new and desire to secure by Letters Patent—

1. The method of operating and regulating electric motors substantially as hereinbefore described, which consists in supplying the field-coils of a motor with a constant exciting-current, as from a line circuit; initially increasing the strength of the field of the motor, by means of an independent electric current generated outside of, but by power afforded by the motor; then by means of an electric current produced by the electromotive force of the motor, neutralizing the field-exciting power of the independent electric current, and with any undue speed of the motor, reversing the direction of said independent current, for enabling it to partially neutralize the motor-field and check the speed of the motor.

2. The combination substantially as hereinbefore described, with the armature and field-coils, in an electric motor, of an electric generator provided with separate field-coils supplied with independent electric currents and driven by the motor, and affording an electric current variable according to the varied speed at which the motor may be driven; and governing field-coils, appropriately arranged with relation to the field-coils of the motor, and supplied with current from said electric generator in a direction opposite to the direction of current in the motor field-coils, substantially as described, whereby in proportion as the speed of the motor-armature is unduly increased, the governing-generator will so reduce the power of the magnetic field of the motor, as to prevent the latter from racing.

3. The combination substantially as hereinbefore described, of an electric motor; a separate electric generator, driven by the motor; governing field-coils in the motor, adjacent to its true field-coils, and supplied with a current from said generator which induces from the governing-coils magnetism opposite to that of the true field-coils; and a field-exciting coil in said generator in series with the main field-coil of the motor.

4. The combination substantially as hereinbefore described, of an electric motor; governing field-coils in said motor adjacent to its true field-coils; a separate electric generator driven by said motor, and containing a field-magnet coil, and also a governing field-coil which is in circuit with the armature of the generator, and also in circuit with, and delivering to the governing field-coils of the motor, a current opposite in direction to that which is supplied to the true field-coils of the motor.

5. The combination substantially as hereinbefore described, with an electric motor, containing true field-coils, separate governing field-coils, and separate auxiliary field-coils, of a governing electric generator, or dynamo, driven by the motor, and also containing true field-coils, and two separate governing field-coils, the true field-coils of both the motor and the generator, receiving exciting-current from outside sources; the auxiliary field-coil of the motor being in shunt-circuit with the motor-armature, and also in circuit with one of the governing-coils of the generator; and the governing-coil of the motor, being in circuit with the other of the governing field-coils of the generator, and with the generator-armature.

6. The combination of the armature of an electric motor; the armature of an electric generator serving as a governor for the motor, and a casing of magnetic metal embodying a central frame longitudinally surrounding both armatures and affording seats for a shaft common thereto, and provided with cheek-pieces detachably secured to said frame.

RUDOLF EICKEMEYER.

Witnesses:
JAMES S. FITCH,
O. BEVARING.